(12) United States Patent
Focke et al.

(10) Patent No.: US 7,222,626 B2
(45) Date of Patent: May 29, 2007

(54) PRODUCTION AND/OR PACKAGING INSTALLATION, AND METHOD OF OPERATING THE SAME

(75) Inventors: Heinz Focke, deceased, late of Verden (DE); by Jürgen Focke, legal representative, Verden (DE); by Doris Focke, legal representative, Verden (DE); Hartmut Olbrich, Verden (DE); Cord Schröder, Nienburg (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 111 days.

(21) Appl. No.: 10/804,229

(22) Filed: Mar. 19, 2004

(65) Prior Publication Data

US 2004/0231298 A1 Nov. 25, 2004

(30) Foreign Application Priority Data

Mar. 25, 2003 (DE) ................. 103 13 393

(51) Int. Cl.
*B65B 19/28* (2006.01)
*B65B 19/00* (2006.01)

(52) U.S. Cl. ............. 131/283; 131/280; 700/108; 700/117; 53/148; 53/444

(58) Field of Classification Search ............ 700/95, 700/108, 109, 110, 117; 131/58, 280, 283, 131/908, 910, 909; 702/182, 183; 53/137, 53/148, 444

See application file for complete search history.

(56) References Cited

U.S. PATENT DOCUMENTS

| 4,827,423 A | * | 5/1989 | Beasley et al. ............... 700/96 |
| 4,865,054 A | * | 9/1989 | Lorenzen et al. ........... 131/280 |
| 4,865,179 A | | 9/1989 | Carter et al. |
| 6,516,811 B1 | * | 2/2003 | Focke et al. ............... 131/283 |

FOREIGN PATENT DOCUMENTS

| DE | 196 35 598 A1 | 3/1998 |
| DE | 199 14 297 A1 | 10/2000 |
| EP | 614 814 A1 | 9/1994 |
| JP | 10207950 | 8/1998 |
| JP | 2002091543 | 3/2002 |

* cited by examiner

*Primary Examiner*—Leo Picard
*Assistant Examiner*—Charles Kasenge
(74) *Attorney, Agent, or Firm*—Sughrue Mion, PLLC

(57) ABSTRACT

The invention specifies a production and/or packaging installation containing a performance-limiting means, and also specifies the method of operating the same, with the result that this installation can be sold to a purchaser with a certain performance capability guaranteed and only the guaranteed performance level can be retrieved, measures for reducing the performance level of the installation being taken or initiated in the event of manipulation for increasing the performance level or for bypassing the performance-limiting means.

7 Claims, 6 Drawing Sheets

PRODUCTION AND/OR PACKAGING INSTALLATION, AND METHOD OF OPERATING THE SAME

BACKGROUND OF THE INVENTION

The invention relates to a production and/or packaging installation according to the preamble of claim 1 and to a method of operating the same. Such production and/or packaging installations are known in the prior art.

The object of the invention is to specify a production and/or packaging installation containing a performance-limiting means, and also to specify a method of operating the same, with the result that this installation can be sold to a purchaser with a certain performance capability guaranteed and only the guaranteed performance level can be retrieved.

General performance-limiting means are known in various embodiments in the prior art. For example a performance-limiting means is known for motor vehicles to the effect that, when a predetermined maximum speed is reached, the fuel supply is blocked off, with the result that the maximum speed cannot be exceeded. Furthermore, in the case of so-called shareware, that is to say initially freely available software, it is provided that this has a limited scope of performance. It is only once a purchase price has been paid that the software user obtains a code number in order, while the software remains unchanged, to activate the entire scope of performance.

A performance-limiting means for a production and packaging installation has not been known up until now. In addition, the known performance-limiting means are not comparable with those for a production and packaging installation. In the case of the shareware, it is only ever the presence of the code number which is checked. There is no interrogation of the performance level retrieved by way of the software. In the case of motor vehicles, a form of retrievable performance level, namely the speed traveled at, is checked. The maximum value of the retrievable performance level, however, rather than being a performance level which is guaranteed to the vehicle purchaser, is a safety-related upper speed limit.

SUMMARY OF THE INVENTION

The object mentioned above is achieved according to the invention by the features of claim 1 and by a method having the features of claim 6.

The invention is based on the knowledge that, up until now, production and packaging installations have been produced in respect of the performance capability required by the respective customer. This results in a manufacturer of such installations producing different types of installation with different performance data. On account of the resulting additional outlay in terms of development, quality assurance, documentation, storage, etc., this is disadvantageous. In addition, the customer is faced with a situation where it is often not easily possible for an operating installation to be upgraded to a higher performance level. It is then necessary to exchange at least some parts of the installation, which disadvantageously results in stoppage periods of the installation.

The advantage of the invention is the production of only a reduced number of types of installation, preferably of just one type of installation, with a scalable performance level. The installation is set for the respective customer in accordance with the performance level required. The installation comprises arrangements and means for detecting manipulations of the performance-level setting and for ensuring that it is not possible to retrieve from the installation any performance level in addition to the guaranteed performance level. If a performance level, once purchased, is no longer sufficient for the customer at a later point in time, it is possible for the performance-limiting means to be removed or for the performance level of the installation to be limited to a higher performance level. Furthermore, a brief increase in the retrievable performance level is also conceivable. For this purpose, code numbers are stored, for example, in the installation-control means. The operator of the installation can ascertain a code number from the manufacturer and enter this code number into the control means. If the entered code number corresponds with a stored code number a higher performance level can be retrieved briefly, that is to say during a limited period of time, from the installation. Provision may be made here for the operator of the installation to purchase a code number from the manufacturer. A used code number is automatically deactivated in the installation-control means. Furthermore, different categories of code number may be provided, a first category allowing a performance-level increase for a limited period of short duration, e.g. a number of days or a number of shifts, a second category allowing an elevated performance-level increase, etc. Instead of a brief time-specific performance-level increase, it is also possible to have a brief quantity-specific performance-level increase.

It is a special feature of the method according to the invention that the guaranteed performance level relates to a production result, that is to say, for example, to a number of (cigarette) packs which correspond to predetermined criteria. The operator of the installation can thus assume reliable production numbers because the operational speed of the installation is automatically controlled such that, in a certain period of time, the guaranteed performance level, that is to say the number of non-defective packs, is produced. It is thus even possible to compensate for machine-stoppage periods.

BRIEF DESCRIPTION OF THE DRAWING

A preferred exemplary embodiment of the invention is explained in more detail hereinbelow with reference to the drawing, in which.

DETAILED DESCRIPTION OF THE INVENTION

Figure 1:
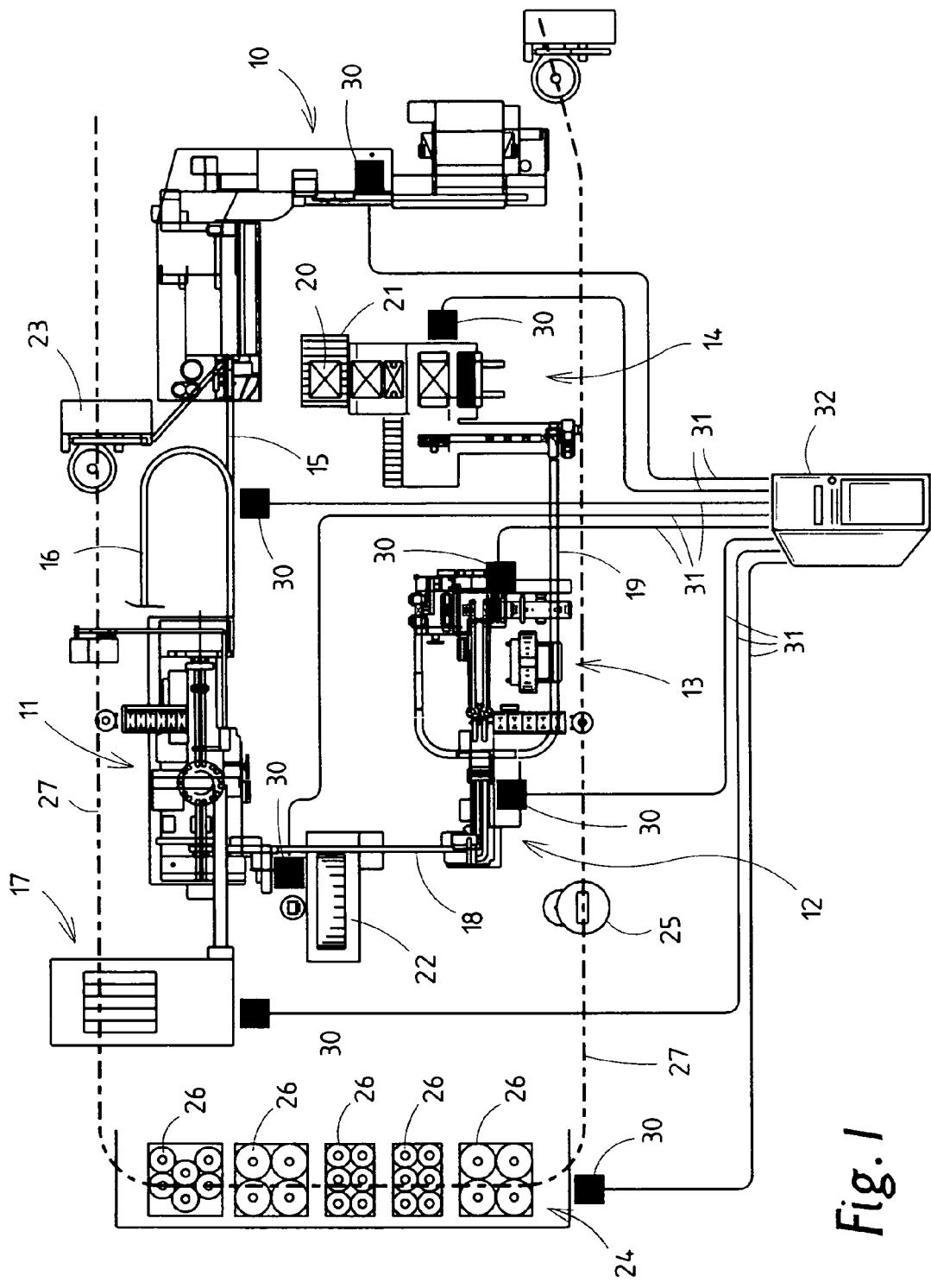
FIG. 1 shows a schematic plan view of a production and packaging installation for cigarettes.

The exemplary embodiment illustrated in the drawings relates to a production and packaging installation for cigarettes, that is to say a so-called production line. The latter comprises production units, for example a cigarette-production machine, namely a maker 10, a following packaging machine, a packer 11, a subsequent film-wrapping machine 12, a packaging machine for producing multipacks from a plurality of cigarette packs, that is to say a multipacker 13, and a cartoner 14 which packs the (cigarette) multipacks into a shipping carton. Cigarettes produced by the maker 10 are sent by a cigarette conveyor 15, with an associated cigarette store 16, to the packer 11 for the production of hinge-lid boxes, so-called hinge-lid packs. The packer 11 is assigned a blank store 17, that is to say a device for accommodating a relatively large supply of prefabricated blanks for the hinge-lid boxes. The cigarette packs produced by the packer 11 are fed to the film-wrapping machine 12 via a pack conveyor 18. This film-wrapping machine has the task of wrapping the cigarette packs in a film or plastic blank. The completed cigarette packs are used to form pack groups which are provided, in the region of the multipacker 13, with a multipack wrapper, thus producing a cigarette multipack comprising usually ten cigarette packs. These cigarette multipacks are fed to the cartoner 14 by a multipack conveyor 19. This cartoner transfers finished shipping cartons with a plurality of cigarette multipacks to a shipping-carton removal conveyor 21. Located in the region of the pack conveyor 18 between packer 11 and film-wrapping machine 12 is a pack store 22 for accommodating a relatively large number of cigarette packs. The maker 10 is assigned a filter-attachment machine 23. The production units described are supplied with material, in particular in the form of wound webs, namely reels 26, from a material store 24, it being possible for the material to be removed by means of a material conveyor 25. For this purpose, the material conveyor 25 can be moved along a conveying belt 27.

The individual production units, namely the maker 10, packer 11, film-wrapping machine 12, multipacker 13, cartoner 14, cigarette conveyor 15 and cigarette store 16 and also the blank store 17 are assigned control means 30 for picking up data (input values) from the individual production unit and for influencing the production unit with output values, that is to say, for example, digital output values for switching individual mechanisms of the production unit on and off or analogue output values for specifying desired or guide values, e.g. temperatures or speeds. The control means 30 are communicatively connected to one another and to a higher-level control means 32 via a bus 31, in particular a field bus. The individual production units operate in a coordinated manner in the production line, i.e. in particular the speeds of the production units are coordinated with one another such that a production unit which precedes a central production unit, e.g. the packer 11, in the production process, in other words the maker 10, is coupled to the central production unit such that the maker 10 does not produce more products than the packer 11 can process. Subsequent production units in the production process, that is to say the film-wrapping machine 12 and multipacker 13, are coupled to the central production unit such that they can process at least the products which are supplied directly or indirectly by the central production unit. In individual cases, the production units coupled to one another may be interspersed with stores, e.g. a cigarette store 16 and pack store 22. The general coupling arrangement is nevertheless maintained.

Figure 2:
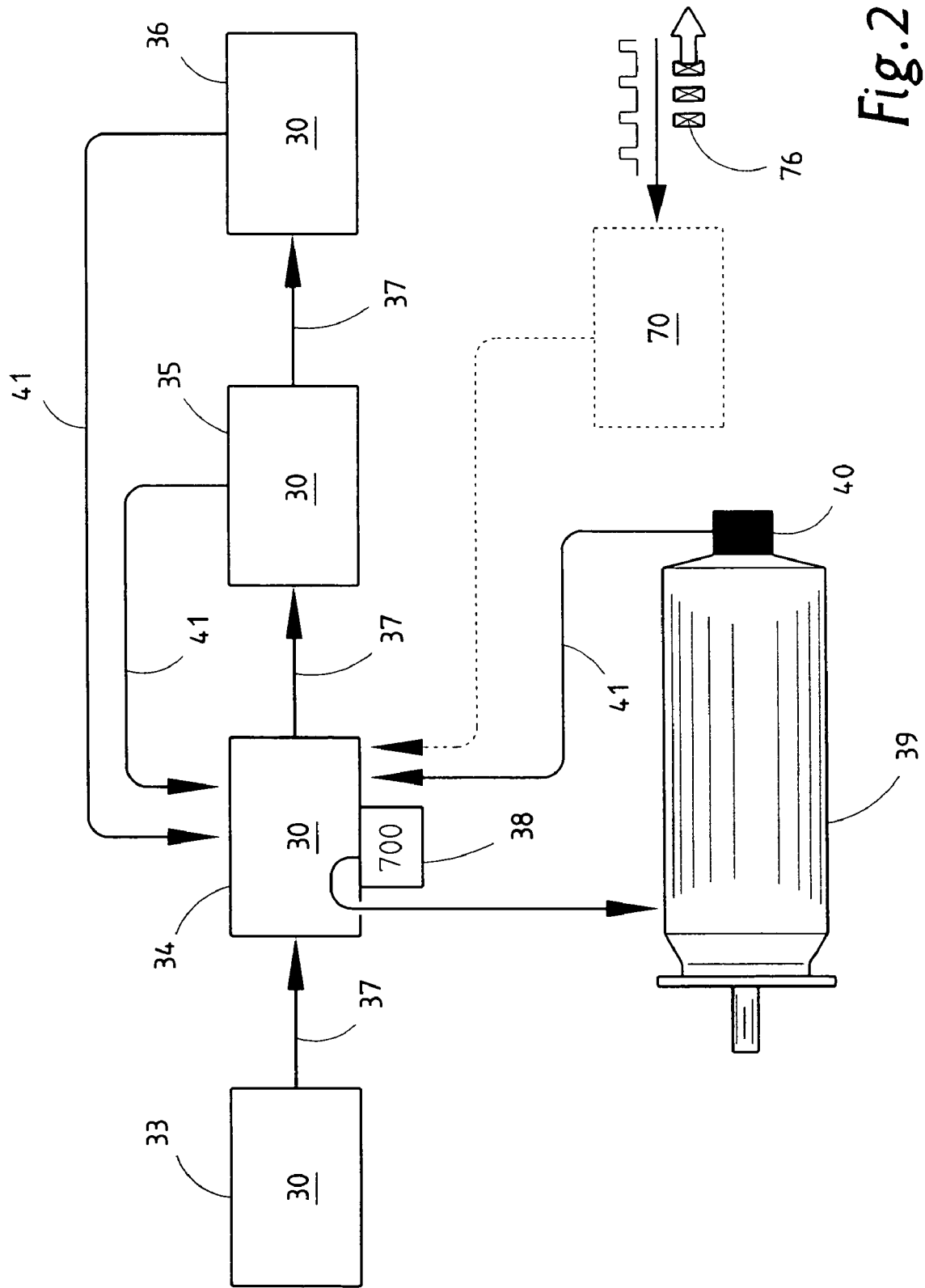
FIG. 2 shows a schematic illustration of part of the production and packing installation.

FIG. 2 shows a schematic illustration of part of the production line described. The operation of each production unit is controlled by a respective control means 30. A first control means 30—maker-control means 33—is provided for controlling and/or monitoring the maker 10 and a second control means 30—packer-control means 34—is provided for controlling and/or monitoring the packer 11. Further control means 30—cellophane-control means 35, boxer-control means 36—are provided for controlling and/or monitoring the film-wrapping machine 12 and the multipacker 13, respectively. Stored in the individual control means 30, in a manner known per se, is the control program, in accordance with which it is possible to activate the individual production units for carrying out the respective production and/or packaging process by means of predeterminable output values at outputs of the control means 30. The coordination of the production units is based on the fact that each production unit transmits speed-related information 37 to the subsequent production unit in each case. The speed-related information 37 for the cellophane-control means 35 and the boxer-control means 36 here is derived from the packer-control means 34, which functions as coordinating control means, from a specified speed or performance value stored in a performance-specifying or speed-specifying device 38, in this case in the form of an upper speed limit, e.g. 700 rpm. The specified performance value is transmitted by the packer-control means 34 to a drive 39, assigned to the packer 11, as a desired or guide value for the speed thereof. The drive 39, which is, in particular, a central drive of the production unit, such that the production unit comprises further drives with speeds depending directly or indirectly on the speed of the central drive, is assigned a resolver 40 for picking up the rotational speed. The (rotational) speed is transmitted to the packer-control means 34 via the resolver 40. Each further production unit is assigned, corresponding to the driver 39 described, dedicated drives (not illustrated), to which is transmitted, in accordance with the respective speed-related information 37, a desired or guide value for the speed thereof and from which the current speed is transmitted to the respective control means 30. The drives 39 are examples of activatable mechanisms of the individual production units. Examples of further activatable mechanisms are pneumatic or hydraulic subassemblies or heaters (not illustrated), to which it is possible to transmit in each case desired values for the activation thereof, and also it is possible to transmit the status, as actual value, to the respective control means 30. A specified speed value is replaced by a specified performance value, in the case of any desired activatable mechanisms, and the speed-related information 37 is correspondingly replaced by performance-related information.

During operation of the production line, the drive 39 of the packer 11 is thus operated at a nominal performance level predetermined by the performance-specifying device 38. The speeds reached by the drive 39 and the subsequent production devices are transmitted as speed-related feedback 41 to the coordinating control means. The coordinating control means compares these speeds with the specified speed value and the speed-related information 37, the specified speed value for the subsequent machines. In the case of a difference between the indicated speed and the predetermined speed, in particular in the case of a difference which exceeds the predetermined amount, and from which it is possible to conclude that manipulation has been carried out in order to achieve a higher production performance level, the measures predetermined by the coordinating control means are initiated. These measures comprise, for example, reducing the performance level of individual production units or of all the production units, e.g. reducing the speed of the drive 39.

Figure 3:
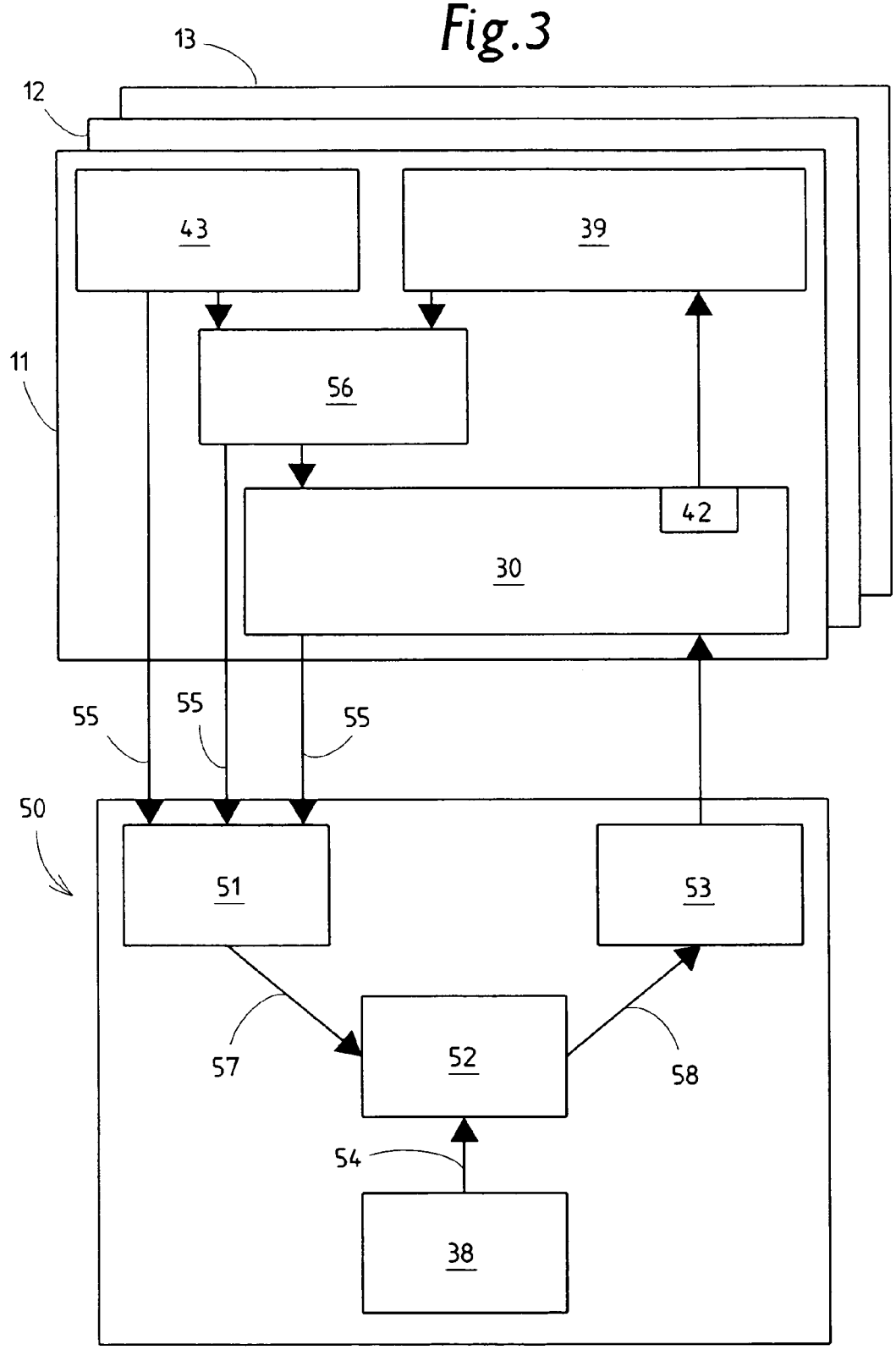
FIG. 3 shows a further schematic illustration of the production and packing installation with individual production units and a performance-monitoring device.

FIG. 3 shows a further schematic illustration of the above described production line with a number of production units, that is to say, for example, the packer 11, film-wrapping machine 12 and multipacker 13. Each production unit has at least one activatable mechanism, that is to say, for example, the drive 39. The operation of the or each production unit is controlled by a control means 30. Provided for this purpose is the control program, in accordance with which it is possible to activate the individual production units or the activatable mechanisms for carrying out a production and/or packaging process by means of predeterminable output values at outputs 42 of the control means 30. The activatable mechanism influences a functional unit 43 of the production unit, e.g. in that the functional unit 43 is driven by the drive 39. The control means is therefore provided for forming performance data 55 with reference to speeds of selected drives 39 and/or production quantities of individual production units or all production units.

In order to limit the performance level of the production and/or packaging installation to a nominal performance level which is guaranteed to an operator of the installation and has been purchased by this operator, a performance-monitoring device 50 with a performance-detecting device 51, a performance-specifying device 38 (see also FIG. 2), a comparator 52 and a performance-limiting device 53 is provided. The performance-specifying device 38 is provided for producing a performance-related desired value 54 with reference to the nominal performance level. The performance-detecting device 51 is provided for receiving performance data 55 either from a sensor system 56 assigned the respective production unit, that is to say, for example, from the resolver 40, or from the production unit or the control means 30 assigned to the production unit, and for producing a performance-related actual value 57 with reference to the performance data 55. The comparator 52 is provided for comparing the performance-related actual value 57 and performance-related desired value 54 and, if the performance-related actual value 57 exceeds the performance-related desired value 54, for generating an activating signal 58 for the performance-limiting device 53. The performance-limiting device 53, finally, serves for initiating the abovementioned measures, that is to say, for example, for reducing the performance level of individual production units 10 or of all the production units 10 in the presence of an activating signal 58. For this purpose, the performance-limiting device 53 influences the control means 30, and possibly also a plurality of control means 30. The influencing operation may relate to one or more output values or outputs 42 and comprise, for example, activation and/or deactivation of one or more output values or outputs 42. The control means is therefore provided for checking the performance-limiting device 50 and for stopping individual production units or all production units if the check fails. This activation or deactivation of output values or outputs may differ from the activation or deactivation of these output values or outputs 42 by the control program, such that the performance-limiting device 53 "overwrites" measures of the control means 30 or of the control program. The activating signal 58 may be a digital activating signal 58, the performance level of individual production units or of all the production units being reduced by a predetermined extent in the presence of the activating signal 58. As an alternative, the activating signal 58 may also be an analogue activating signal 58, the strength of the activating signal 58 being derived from the difference between the performance-related actual value 57 and performance-related desired value 54 and predetermining the extent of the performance-level reduction.

One configuration of the invention is explained with reference to FIG. 4. The performance-limiting means in this exemplary embodiment relates to production of a number of non-defective (cigarette) packs, or acceptable packs, during a certain unit of time T, e.g. a shift. The unit of time T is plotted on a time axis t. The number of packs produced in each case corresponds with a speed of a central drive of the production line, that is to say, for example, of the drive 39. The speed n is plotted on the y-axis. Also plotted on the y-axis are a maximum speed $n_{max}$, a nominal speed $n_{nom}$ and an excess speed $n_{ex}$. The nominal speed $n_{nom}$ corresponds with the speed of the central drive at which a guaranteed number of acceptable packs (nominal production) can be produced. The maximum speed $n_{max}$ is the maximum speed at which the central drive can be operated. The predetermined performance level corresponds to the mathematical product of the unit of time T and a number of packs which is produced at the nominal speed $n_{nom}$ and is illustrated graphically as the region 60 outlined in bold. The invention is for this predetermined performance level to be fulfilled without it being possible for an additional performance level to be retrieved by manipulation.

When the production line is started up, that is to say when the speed n of the central drive is rapidly increased from zero in the direction of the nominal speed $n_{nom}$, a start-up ramp 61 is produced. The required number of packs cannot yet be produced throughout the duration of the start-up ramp 61. An actual number of packs below the required number of packs is illustrated by the "encircled minus" symbol. Once the nominal speed $n_{nom}$ has been reached for the first time, it is initially exceeded and the production line is operated at the excess speed $n_{ex}$. Consequently, for the duration of the excess speed $n_{ex}$, more packs are produced than are required. Thus corresponding with the excess speed $n_{ex}$ is a period of intended excess production 62 at the beginning of the unit of time T as a reserve for possible worsening of the production results as the unit of time T proceeds further. An actual number of packs above the required number of packs is illustrated by the $\oplus$ (encircled plus) symbol. In the exemplary embodiment illustrated, the period of intended excess production 62 is followed by a period of poor pack production 63, the duration of which cannot be foreseen. The required number of packs is not reached during this period. Following the period of poor pack production 63, the production line is operated at a maximum performance level 64 corresponding to the maximum speed $n_{max}$, in order to compensate once again for the deficits brought about by the period of poor pack production 63 (compensation for the period of poor pack production 63 is provided at the changeover in hatching). As soon as the deficit has been compensated for, the production line is operated within the range of intended excess production 62, in order to accumulate a reserve for any possible production failures as the unit of time T proceeds further. In actual fact, following this second period of intended excess production 62, the exemplary embodiment also shows the situation of total discontinuation of operation 65, that is to say one in which no cigarette packs at all are produced. Once this total discontinuation of operation 65 has been cancelled, the production line is operated, once again, at the maximum performance level 64, in order to compensate for the deficit during the total discontinuation of operation 65. At the end of the unit of time T, on average precisely the guaranteed nominal production level is achieved in this way. Should the required quantity not have been achieved at the end of the unit of time T, provision is made for an automatic increase in the unit of time T within a predetermined tolerance. Should the required production level already have been achieved prior to the end of the unit of time T, the production is also terminated prior to the end of the unit of time T, once the required nominal production level has been achieved. The amount of time by which the unit of time T can extended or shortened in this way is designated Δt in the drawing. The surface area below the graph 66 of the number of acceptable packs corresponds with the surface area of the region 60, which is defined by the nominal speed lower $n_{nom}$ and the unit of time T.

Figure 4:
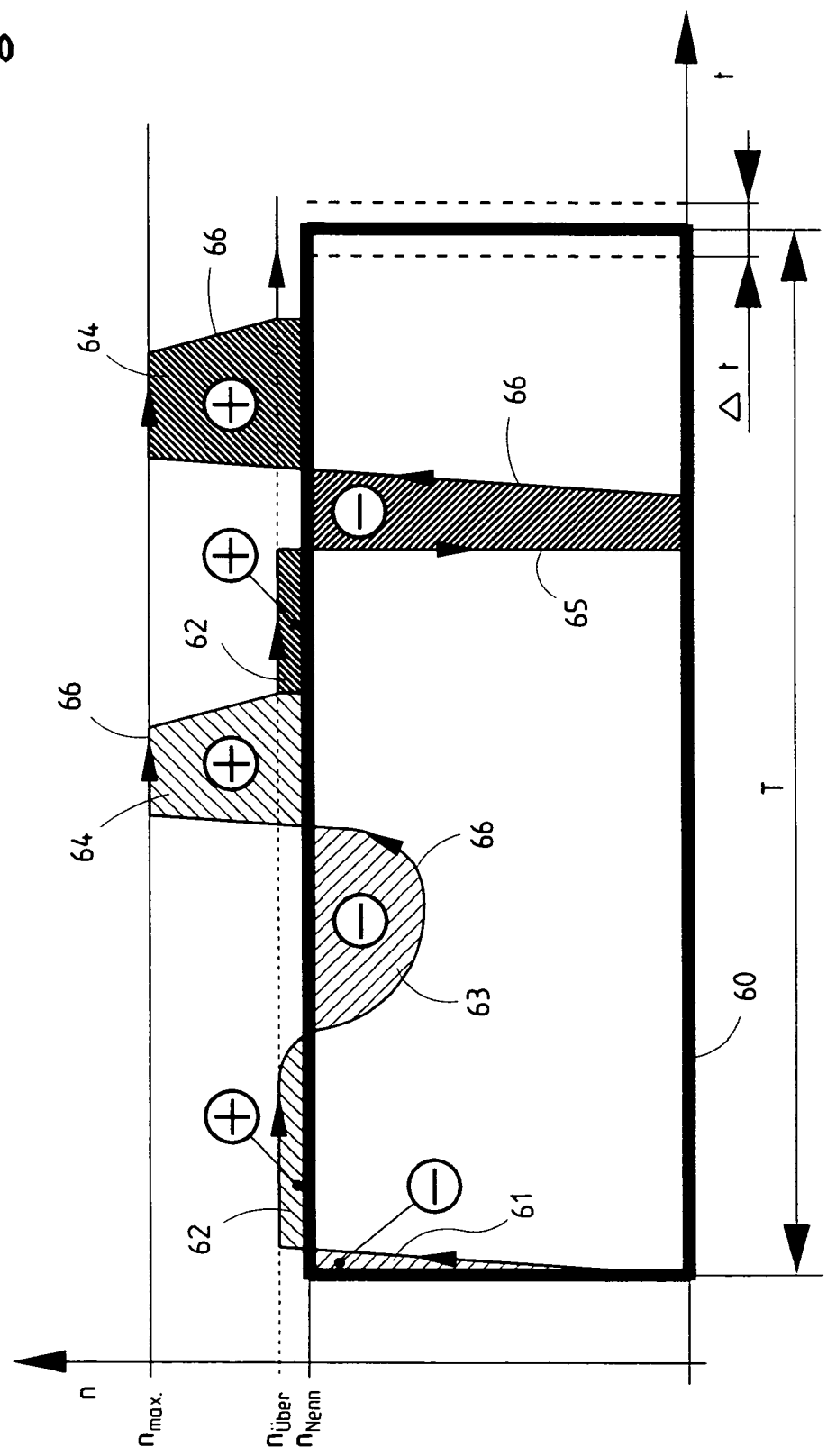
FIG. 4 shows an illustration of a production sequence in the case of a guaranteed performance level of the production and packaging installation in the form of a certain number of non-defective (cigarette) packs.
Figure 5:
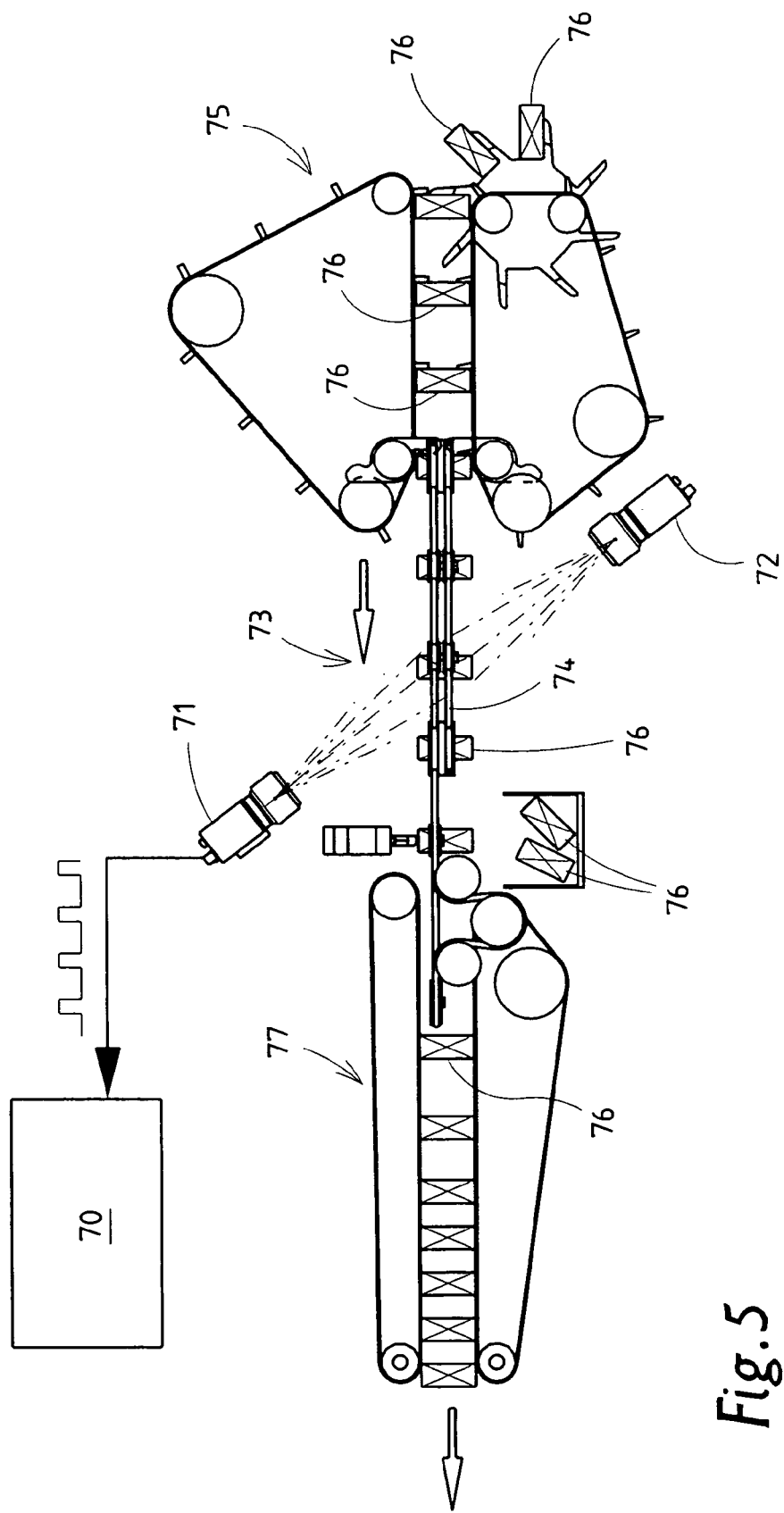
FIG. 5 shows a device for checking (cigarette) packs.
Figure 6:
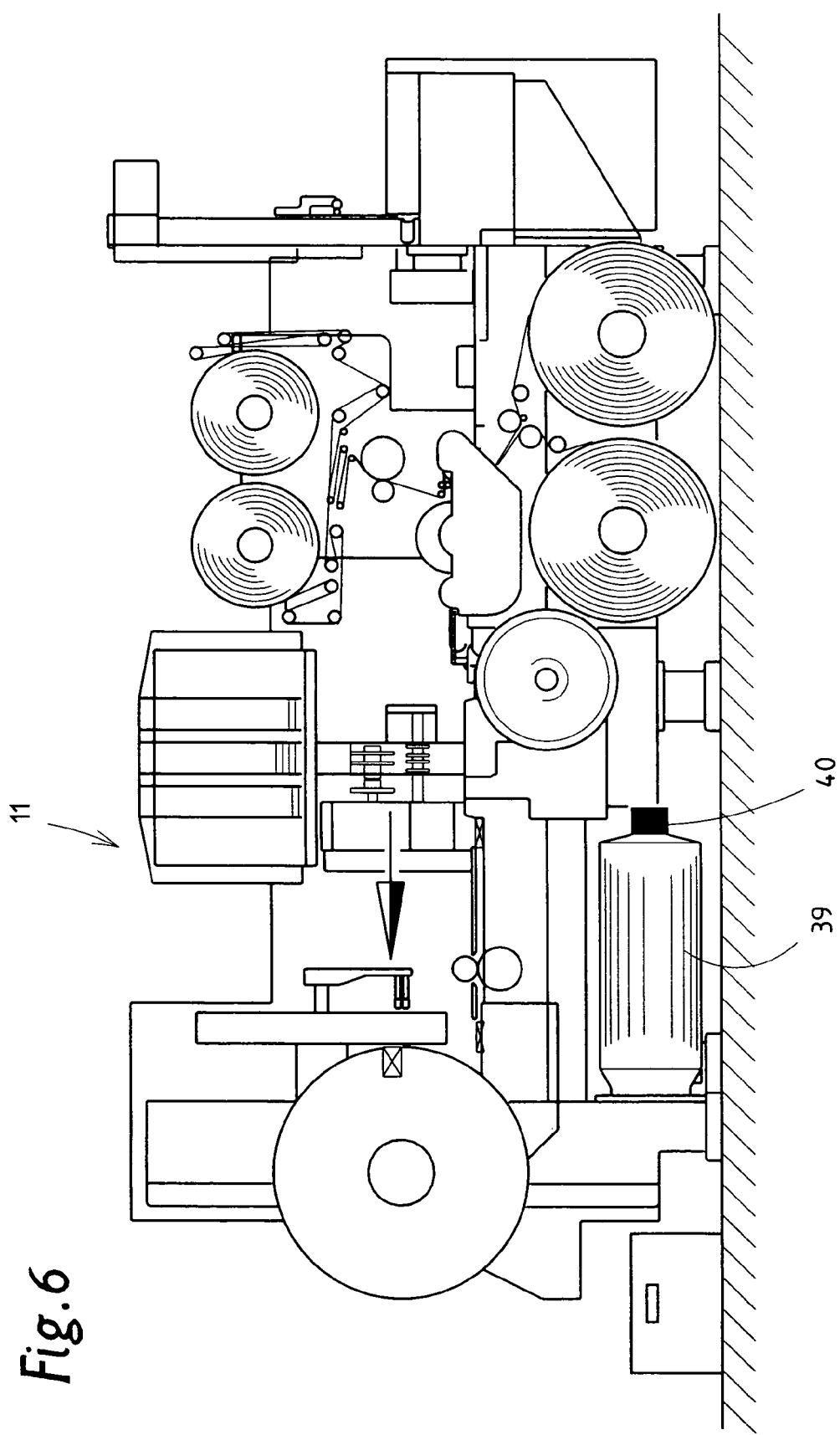
FIG. 6 shows a packaging machine (packer) of the production and packaging installation.

The number of acceptable packs, which is plotted on the x-axis in the illustration according to FIG. 4, is determined by a counting control means 70. The latter is illustrated schematically in FIG. 5. The counting control means 70 receives, for each acceptable pack, a pulse from testing elements, namely cameras 71, 72, which are arranged above and beneath a conveying section 73 in each case. The conveying section 73 belongs to a testing conveyor 74 arranged between a feed conveyor 75 and a removal conveyor 77. The feed conveyor 75, testing conveyor 74 and removal conveyor 77 and also the testing elements and the functioning thereof are described in DE 198 39 852 A1. Cigarette packs 76 which have been determined as being defective (defective packs) by the testing elements are separated out. The feed conveyor 75, testing conveyor 74 and removal conveyor 77 and also the testing elements are a constituent part of a packaging machine which is illustrated in a schematic overall view in FIG. 6, that is to say of a packer 11, in particular of so-called hinge-lid packer, at the position indicated by the arrow. The packer 11 comprises the drive 39, which forms the central drive of the production line, because all the rest of the speeds of drives and movable mechanisms of further production units are coordinated with its speed.

The counting control means 70 has already been shown (illustrated by dashed lines) in FIG. 2. The signal relating to the number of acceptable packs which is supplied by the counting control means 70 is sent to the packer-control means 34, which determines the necessary speed n of the drive 39 therefrom in order to obtain overall, during the period of time T, a guaranteed number of acceptable packs, the guaranteed performance level. The necessary speed determined corresponds, in the illustration in FIG. 4, with the graph 66 which bounds the surface areas of the period of intended excess production 62 and the maximum performance level 64. For the section of poor production 63 and of total discontinuation of operation, the necessary speed determined lies between the nominal speed $n_{nom}$ and the maximum speed $n_{max}$, in particular between the excess speed $n_{ex}$ and the maximum speed $n_{max}$. The determination of the necessary speed is based, in particular, on a control algorithm which, as the desired value, processes the nominal number of acceptable packs corresponding with the nominal speed $n_{nom}$ and, as the actual value, processes the actual number of acceptable packs produced and, as the manipulated-variable value, supplies a speed n for the drive 39. The control algorithm is, for example, a proportional, proportional-integral or proportional-differential control algorithm or is produced from a combination of these algorithms. It is likewise possible for the control algorithm to be based on so-called fuzzy control. It is possible to predetermine the desired value, that is to say the number of acceptable packs which is to be produced, as nominal production by means of a performance-specifying device 38.

Monitoring of the specified value of the number of acceptable packs which is to be produced—that is to say detection of any possible manipulation of the nominal speed $n_{nom}$—takes place by way of the control algorithm itself. That is to say, if the nominal speed $n_{nom}$ is increased by manipulation, in the first instance cigarette packs are produced in accordance with this increased speed, or, in actual fact, even in accordance with the excess speed $n_{ex}$, which is above the manipulated speed. Over the period of time T, a quantity of cigarette packs which is greater than the nominal production level is thus produced at each point in time. The control algorithm compensates for this in a manner analogous to a period of poor production 63 or total discontinuation of operation 65, with adaptation of the speed n of the drive 39. In this case, however, the compensation results in a reduction in the speed n. This means that, despite manipulation, larger numbers of packs are not produced over the time interval T. The additional production which has become possible at the start of the time interval T on account of manipulation is compensated for by a corresponding decrease in production at the end of the time interval T, this being brought about by a reduction in the speed of the drive 39 or by the drive 39 being switched off, that is to say by the time interval T being shortened. In order to achieve this functionality, use can be made of the performance-monitoring device 50 which has already been described, the performance-detecting device 51 obtaining the number of acceptable packs produced from the counting control means 70. This number is compared, by the comparator 52, with that number of acceptable packs to be produced which is stored, in a manipulation-resistant manner, in the performance-specifying device 38. If the required number of acceptable packs has been reached, the drive 39 is switched off under the influence of the performance-limiting device 53, that is to say the time interval T is shortened. The comparator 52 need not necessarily take account of the respectively current value of the number of acceptable packs produced; rather, it can also detect when the predetermined number of acceptable packs will be achieved by means of interpolation from the number of acceptable packs produced during a certain period of time, with the result that the speed of the drive 39 can be reduced continuously under the influence of the performance-limiting device 53, so that, despite manipulation, only the required quantity of acceptable packs has been produced at the end of the time interval, without the drive being "switched off abruptly". The value of the excess speed $n_{ex}$ or a predetermined duration of the period of intended excess production 62 is preferably variable and is influenced by the control algorithm. If, following a number of time intervals T, the required nominal production level is always achieved prior to the end of the time interval T, the excess speed $n_{ex}$ and/or the duration of the period of intended excess production 62 may be reduced in accordance with a separate control algorithm. If, in contrast, during a number of time intervals T, production always has to be extended beyond the actual length of the time interval T, the excess speed $n_{ex}$ and/or the duration of the period of intended excess production 62 can be increased in accordance with a separate control algorithm.

The invention claimed is:

1. A production and/or packaging installation for producing or packaging cigarettes, having a number of production units, namely a maker (10), packer (11), film-wrapping machine (12) and a multipacker (13), each production unit or all the production units being assigned a sensor system (56) provided for picking up performance data, characterized by a performance-monitoring device (50), which is provided for scaling the production or packaging performance level which can be retrieved by the installation, with a performance-detecting device (51), a performance-specifying device (38), a comparator (52) and a performance-limiting device (53), it being the case that the performance-specifying device (53) is provided for producing a performance-related desired value (54) with reference to the performance level which is guaranteed to an operator of the production and/or packaging installation with respect to the production or packaging performance level that can be retrieved by the installation, that the performance-detecting device (51) is provided for receiving performance data (55) from the sensor system (56) and for producing a performance-related actual value (57) with reference to the performance data (55), that the comparator (52) is provided for comparing the performance-related actual value (57) and performance-related desired value (54) and, if the performance-related actual value (57) exceeds the performance-related desired value (54), for generating an activating signal (58) for the performance-limiting device (53), and that a performance-limiting device (53) is provided for reducing the performance level of individual production units or of all the production units.

2. The production and/or packaging installation according to claim 1, characterized by a control means (30) which is provided for controlling the production units, the performance-detecting device (51) being provided for receiving performance data (55) from the sensor system (56) and the control means (30) or for evaluation of the performance data (55) from all the production units, namely, if appropriate, the cigarette-production machine (maker 10) and packaging machine (packer 11) and, if appropriate, the film-wrapping machine (12) and multipacker (13).

3. A method of operating a production and/or packaging installation for producing or packaging cigarettes, having a number of production units, namely a maker (10), packer (11), film-wrapping machine (12) and a multipacker (13), each production unit or all the production units being assigned a sensor system (56) provided for picking up performance data, characterized in that a control means (30) assigned to a production unit obtains, from a performance-specifying device (38), a specified performance value which corresponds to a performance level which is guaranteed to an operator of the production and/or packaging installation with respect to the production or packaging performance level that can be retrieved by the installation, namely with respect to a number of non-defective (cigarette) packs —acceptable packs—, or with respect to a number of acceptable packs during a predetermined or predeterminable period of time (T), in that a drive (39) assigned to the production unit is activated in accordance with the specified performance value, in that a speed of the drive (39) is determined and compared with the specified performance value, and in that, in the case of a difference between the specified performance value and speed determined for the drive (39), predetermined measures are initiated by a performance-limiting device (53), in particular the drive (39) is switched off or the speed of the drive (39) is reduced.

4. The method according to claim 3, characterized in that speed-related information (37) for subsequent production units in the production process are derived from the specified performance value and transmitted to the production units, in that speed-related feedback (41) is transmitted from the subsequent production units to the control means (30), in that individual pieces of speed-related information (37) or all the pieces of speed-related information (37) are compared with the respectively associated speed-related feedback (41), and in that, in the case of a difference between the speed-related information (37) and associated speed-related feedback (41), predetermined measures are initiated, namely the drive (39) is switched off, the speed of the drive (39) is reduced or the respective production unit is switched off.

5. The method according to claim 3, characterized in that a drive (39) assigned to the production unit is activated for a predetermined or predeterminable time interval (T) in accordance with a specified performance value, in respect of its speed (n), as follows:

at the beginning of the time interval, the speed (n) is increased in the direction of a nominal speed ($n_{nom}$) corresponding to the specified performance value, once the nominal speed ($n_{nom}$) has been reached, the speed (n) is increased further, for a predetermined or predeterminable period of time, up to an excess speed ($n_{ex}$), during the time interval (T), the number of acceptable packs is sensed continuously and compared with nominal production corresponding to the specified performance value, the speed (n) being reduced if the number of acceptable packs exceeds a predetermined or predeterminable amount, or the speed (n) being increased if the number of acceptable packs falls below the nominal production by a predetermined or predeterminable amount, and production is terminated if the required number of acceptable packs has been reached prior to the end of the time interval (T) or production is continued if the required number of acceptable packs has not been reached at the end of the time interval (T).

6. The method according to claim 5, characterized in that it is possible to change the value of the excess speed ($n_{ex}$) or of the duration of the production at the excess speed ($n_{ex}$)—intended excess production (62)—as a function of the required number of acceptable packs being reached at the end of the time interval (T).

7. The method according to claim 3, characterized in that a brief increase in the specified performance value is provided, the operator acquiring a code in order to achieve the performance-level increase and entering it into the control means (30), the entered code being compared with codes stored in the control means (30) and, in the case of correspondence, the performance-level increase being initiated in accordance with the code.

* * * * *